US012057057B2

(12) United States Patent
Seo et al.

(10) Patent No.: US 12,057,057 B2
(45) Date of Patent: Aug. 6, 2024

(54) DISPLAY DEVICE

(71) Applicant: Samsung Display Co., LTD., Yongin-si (KR)

(72) Inventors: Woori Seo, Seoul (KR); Yunhwan Park, Seoul (KR); Yongjae Kim, Seoul (KR); Yoonjee Shin, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/140,996

(22) Filed: Apr. 28, 2023

(65) Prior Publication Data

US 2023/0395014 A1 Dec. 7, 2023

(30) Foreign Application Priority Data

Jun. 3, 2022 (KR) ........................ 10-2022-0067941

(51) Int. Cl.
*G09G 3/32* (2016.01)

(52) U.S. Cl.
CPC ....... *G09G 3/32* (2013.01); *G09G 2310/0278* (2013.01); *G09G 2310/08* (2013.01); *G09G 2320/0271* (2013.01)

(58) Field of Classification Search
CPC ............. G09G 3/32; G09G 2310/0278; G09G 2310/08; G09G 2320/0271; G09G 2300/0819; G09G 2300/0861; G09G 2310/0251; G09G 2320/0242; G09G 2320/0666; G09G 2330/028; G09G 2340/0435; G09G 2360/16; G09G 3/3233; G09G 3/3225; G09G 3/2074; G09G 3/3266; G09G 3/3275; G09G 2300/0426; G09G 2310/0264
See application file for complete search history.

(56) References Cited

U.S. PATENT DOCUMENTS

| | | | | |
|---|---|---|---|---|
| 10,861,393 | B2 | 12/2020 | Kim et al. | |
| 2023/0069447 | A1* | 3/2023 | Kang | G09G 3/32 |
| 2024/0021155 | A1* | 1/2024 | Hwang | G09G 3/3233 |
| 2024/0021165 | A1* | 1/2024 | Kang | G09G 3/3266 |

FOREIGN PATENT DOCUMENTS

| | | | |
|---|---|---|---|
| KR | 1020150100978 | A | 9/2015 |
| KR | 1020170038979 | A | 4/2017 |
| KR | 1020200142160 | A | 12/2020 |

* cited by examiner

*Primary Examiner* — Rodney Amadiz
(74) *Attorney, Agent, or Firm* — CANTOR COLBURN LLP

(57) ABSTRACT

A display device includes a display panel including a first sub-pixel which displays a first color and is connected to a first data line and a gate line, a gate driver which provides a gate signal to the gate line, a source driver which provides a data voltage to the first data line in a display scan period of a frame and provides a first self-scan voltage to the first data line in a self-scan period of the frame, and a timing controller which calculates a first ratio of each of grayscale values of first color image data for the first color of the frame and determines the first self-scan voltage based on the first ratio.

20 Claims, 15 Drawing Sheets

V255*0.7 + V50*0.3 = V194
V255*0.1 + V0*0.9 = V26

V255*0.7 + V50*0.3 = V194

DISPLAY DEVICE

This application claims priority to Korean Patent Application No. 10-2022-0067941, filed on Jun. 3, 2022, and all the benefits accruing therefrom under 35 U.S.C. § 119, the content of which in its entirety is herein incorporated by reference.

BACKGROUND

1. Field

Embodiments of the invention relate to a display device. More particularly, embodiments of the invention relate to a display device supporting variable frame mode.

2. Description of the Related Art

In general, a display device displays an image with a constant driving frequency of hertz (Hz) or higher. However, a rendering frequency of rendering by a host processor (e.g., a graphic processing unit (GPU)) that provides input image data to the display device may not match the driving frequency of a display panel, and a tearing phenomenon in which a boundary line is generated in the image displayed on the display device may occur due to frequency mismatch.

Accordingly, a variable frame mode in which the rendering frequency of the host processor and the driving frequency of the display panel are synchronized with each other (e.g., Free-Sync mode, G-Sync mode, etc.) has been developed to prevent such a tearing phenomenon.

SUMMARY

A display device may adjust a driving frequency (or a length of a driving frame) of a display panel to synchronize a rendering frequency of a host processor and the driving frequency of the display panel with each other. For such an adjustment of the driving frequency of the display panel, a voltage other than a data voltage may be applied to a data line connected to a pixel. However, a voltage of an anode electrode of a light emitting element may be changed by a difference between the data voltage and the voltage other than the data voltage due to coupling between an anode electrode of the light emitting element of the pixel and the data line.

Embodiments of the invention provide a display device that flexibly determines a self-scan voltage applied to a sub-pixel in a self-scan period According to embodiments of the invention, a display device includes a display panel including a first sub-pixel which displays a first color and is connected to a first data line and a gate line, a gate driver which provides a gate signal to the gate line, a source driver which o provides a data voltage to the first data line in a display scan period of a frame and provides a first self-scan voltage to the first data line in a self-scan period of the frame, and a timing controller which calculates a first ratio of each of grayscale values of first color image data for the first color of the frames and determines the first self-scan voltage based on the first ratio.

In an embodiment, the timing controller may determine a voltage corresponding to a sum of products of a grayscale voltage corresponding to each of the grayscale values of the first color image data and the first ratio as the first self-scan voltage.

In an embodiment, the display panel may further include a second sub-pixel which displays a second color and is connected to a second data line and a third sub-pixel which displays a third color and is connected to a third data line, the source driver may provide the data voltage to the second data line and the third data line in the display scan period, provide a second self-scan voltage to the second data line in the self-scan period, and provide a third self-scan voltage to the third data line in the self-scan period, and the timing controller may calculate a second ratio of each of grayscale values of second color image data for the second color of the frame, determine the second self-scan voltage based on the second ratio, calculate a third ratio of each of grayscale values of third color image data for the third color of the frame, and determine the third self-scan voltage based on the third ratio.

In an embodiment, the timing controller may determine a voltage corresponding to a sum of products of a grayscale voltage corresponding to each of the grayscale values of the second color image data and the second ratio as the second self-scan voltage, and the timing controller may determine a voltage corresponding to a sum of products of a grayscale voltage corresponding to each of the grayscale values of the third color image data and the third ratio as the third self-scan voltage.

In an embodiment, the display panel may further include a second sub-pixel which displays a second color and is connected to a second data line and a third sub-pixel which displays a third color and is connected to a third data line, the source driver may provide the data voltage to the second data line and the third data line in the display scan period, provide a second self-scan voltage to the second data line in the self-scan period, and provide a third self-scan voltage to the third data line in the self-scan period, and the timing controller may determine the second self-scan voltage and the third self-scan voltage based on the first ratio.

In an embodiment, the timing controller may determine a voltage corresponding to a sum of products of a grayscale voltage corresponding to each of the grayscale values of the first color image data and the first ratio as each of the first self-scan voltage, the second self-scan voltage, and the third self-scan voltage.

In an embodiment, the first color is a green color.

In an embodiment, a data writing operation and a light emitting operation may be performed in the display scan period, and the light emitting operation may be performed without the data writing operation in the self-scan period.

According to embodiments of the invention, a display device includes a display panel including a first sub-pixel which displays a first color and is connected to a first data line and a gate line, a gate driver which provides a gate signal to the gate line, a source driver which provides a data voltage to the first data line in a display scan period of a frame and provides a first self-scan voltage to the first data line in a self-scan period of the frame, and a timing controller which determines the first self-scan voltage based on a first average grayscale value of different grayscale values of first color image data for the first color of the frame.

In an embodiment, the timing controller may determine a grayscale voltage corresponding to the first average grayscale value as the first self-scan voltage.

In an embodiment, the display panel may further include a second sub-pixel which displays a second color and is connected to a second data line and a third sub-pixel which displays a third color and is connected to a third data line, the source driver may provide the data voltage to the second data line and the third data line in the display scan period, provide a second self-scan voltage to the second data line in the self-scan period, and provide a third self-scan voltage to the third data line in the self-scan period, and the timing controller may determine the second self-scan voltage based on a second average grayscale value of different grayscale values of second color image data for the second color of the frame, and determine the third self-scan voltage based on a third average grayscale value of different grayscale values of third color image data for the third color of the frame.

In an embodiment, the timing controller may be determine a grayscale voltage corresponding to the second average grayscale value as the second self-scan voltage, and the timing controller may determine a grayscale voltage corresponding to the third average grayscale value as the third self-scan voltage.

In an embodiment, the display panel may further include a second sub-pixel which displays a second color and is connected to a second data line and a third sub-pixel which displays a third color and is connected to a third data line, the source driver may provide the data voltage to the second data line and the third data line in the display scan period, provide a second self-scan voltage to the second data line in the self-scan period, and provide a third self-scan voltage to the third data line in the self-scan period, and the timing controller may determine the second self-scan voltage and the third self-scan voltage based on the first average grayscale value.

In an embodiment, the timing controller may determine a grayscale voltage corresponding to the first average grayscale value as each of the first self-scan voltage, the second self-scan voltage, and the third self-scan voltage.

In an embodiment, the first color may be a green color.

In an embodiment, a data writing operation and a light emitting operation may be performed in the display scan period, and the light emitting operation may be performed without the data writing operation in the self-scan period.

According to embodiments of the invention, a display device includes a display panel including a first sub-pixel which displays a first color and is connected to a first data line and a gate line, a gate driver which provides a gate signal to the gate line, a source driver which provides a data voltage to the first data line in a display scan period of a frame and provides a first self-scan voltage to the first data line in a self-scan period of the frame, and a timing controller which calculates a ratio of each of grayscale values of input image data of the frame and determines the first self-scan voltage based on the ratio.

In an embodiment, the timing controller may determine a voltage corresponding to a sum of products of a grayscale voltage corresponding to each of the grayscale values of the input image data and the ratio as the first self-scan voltage.

In an embodiment, the display panel may further include a second sub-pixel which displays a second color and is connected to a second data line and a third sub-pixel which displays a third color and is connected to a third data line, the source driver may provide the data voltage to the second data line and the third data line in the display scan period, provide a second self-scan voltage to the second data line in the self-scan period, and provide a third self-scan voltage to the third data line in the self-scan period, and the timing controller may determine the second self-scan voltage and the third self-scan voltage based on the ratio.

In an embodiment, the timing controller may determine a voltage corresponding to a sum of products of a grayscale voltage corresponding to each of the grayscale values of the input image data and the ratio as each of the first self-scan voltage, and the second self-scan voltage, and the third self-scan voltage.

In embodiments of the invention, the display device may flexibly determine self-scan voltages applied to each of sub-pixels by including a display panel including a first sub-pixel which displays a first color and is connected to a first data line and a gate line, a gate driver which provides a gate signal to the gate line, a source driver which provides a data voltage to the first data line in a display scan period of a frame and provides a first self-scan voltage to the first data line in a self-scan period of the frame, and a timing controller which calculates a first ratio of each of grayscale values of first color image data for the first color of the frame and determines the first self-scan voltage based on the first ratio.

In embodiments of the invention, the display device may more simply determine self-scan voltages applied to each of sub-pixels by including a display panel including a first sub-pixel which displays a first color and is connected to a first data line and a gate line, a gate driver which provides a gate signal to the gate line, a source driver which provides a data voltage to the first data line in a display scan period of a frame and provides a first self-scan voltage to the first data line in a self-scan period of the frame, and a timing controller which determines the first self-scan voltage based on a first average grayscale value of different grayscale values of first color image data for the first color of the frame.

In embodiments of the invention, the display device may flexibly determine self-scan voltages applied to each of sub-pixels by including a display panel including a first sub-pixel which displays a first color and is connected to a first data line and a gate line, a gate driver which provides a gate signal to the gate line, a source driver which provides a data voltage to the first data line in a display scan period of a frame and provides a first self-scan voltage to the first data line in a self-scan period of the frame, and a timing controller which calculates a ratio of each of grayscale values of input image data of the frame and determines the first self-scan voltage based on the ratio.

In such embodiments, the display device may minimize a voltage change of an anode electrode of a light emitting element caused by coupling between the anode electrode of the light emitting element and a data line by flexibly determining self-scan voltages.

DETAILED DESCRIPTION

Figure 1:
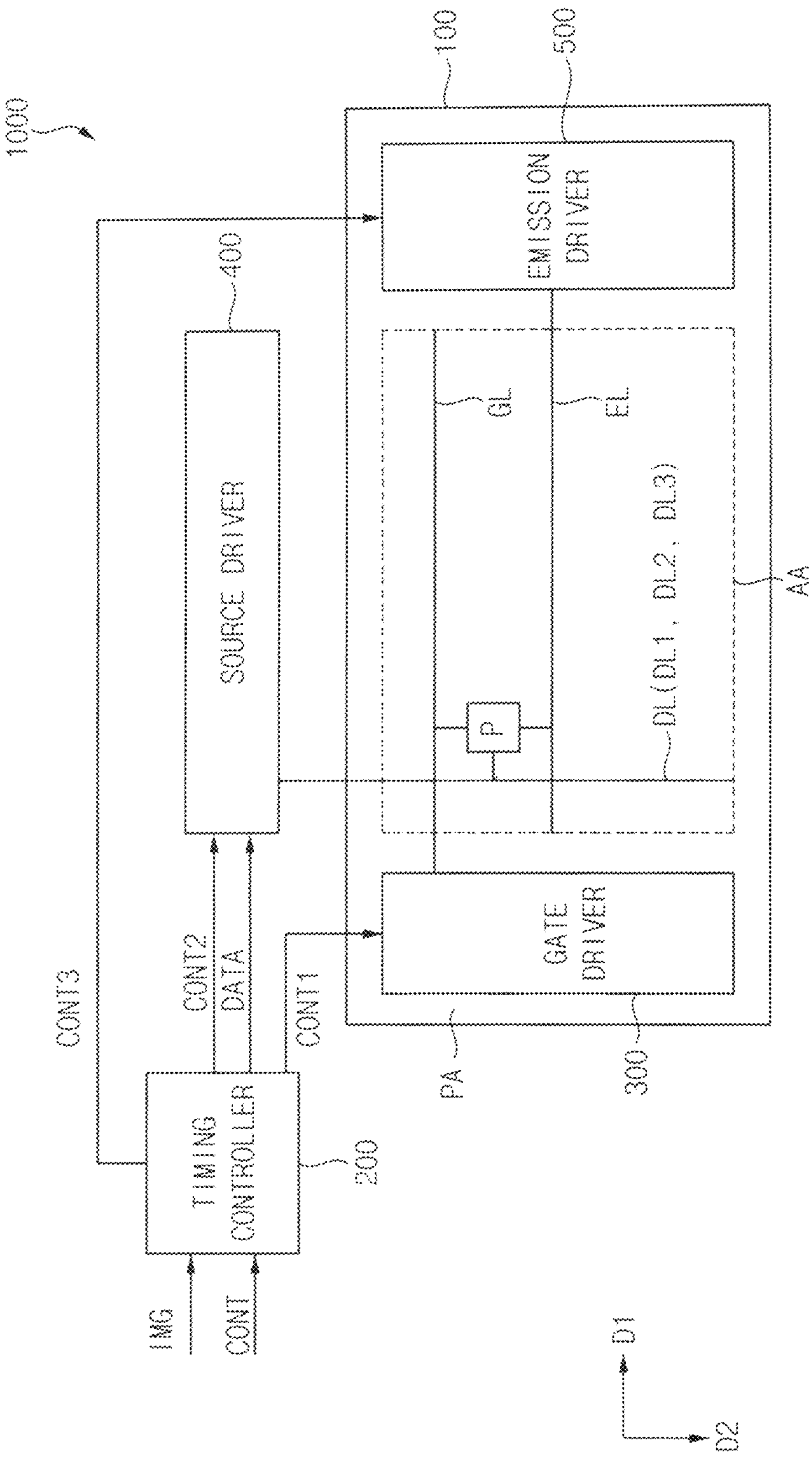
FIG. 1 is a block diagram illustrating a display device according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display device 1000 according to embodiments of the invention.

Referring to FIG. 1, an embodiment of the display device 1000 may include a display panel 100, a timing controller 200, a gate driver 300, a source driver 400, and a emission driver 500. In an embodiment, the timing controller 200 and the source driver 400 may be integrated into one chip.

The display panel 100 has a display region AA on which an image is displayed and a peripheral region PA adjacent to the display region AA. In an embodiment, the gate driver 300 and the emission driver 500 may be mounted on the peripheral region PA of the display panel 100.

The display panel 100 may include a plurality of gate lines GL, a plurality of data lines (DL1, DL2, DL3; DL), a plurality of emission lines EL, and a plurality of pixels P electrically connected to the data lines (DL1, DL2, DL3; DL), the gate lines GL, and the emission lines EL. The gate lines GL and the emission lines EL may extend in a first direction D1 and the data lines (DL1, DL2, DL3; DL) may extend in a second direction D2 crossing the first direction D1.

The timing controller 200 may receive input image data IMG and an input control signal CONT from an external device or a host processor (e.g., a graphic processing unit; GPU). In an embodiment, for example, the input image data IMG may include red image data, green image data and blue image data. In an embodiment, the input image data IMG may further include white image data. In an alternative embodiment, for example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, a third control signal CONT3, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the source driver 400 based on the input control signal CONT and output the second control signal CONT2 to the source driver 400. The second control signal CONT2 may include a horizontal start signal and a load signal.

The timing controller 200 may generate the third control signal CONT3 for controlling operation of the emission driver 500 based on the input control signal CONT and output the third control signal CONT3 to the emission driver 500. The third control signal CONT3 may include a vertical start signal and a emission clock signal.

The timing controller 200 may receive the input image data IMG and the input control signal CONT, and generate the data signal DATA based thereon. The timing controller 200 may output the data signal DATA to the source driver 400.

The gate driver 300 may generate gate signals for driving the gate lines GL in response to the first control signal CONT1 input from the timing controller 200. The gate driver 300 may output the gate signals to the gate lines GL. In an embodiment, for example, the gate driver 300 may sequentially output the gate signals to the gate lines GL.

The source driver 400 may receive the second control signal CONT2 and the data signal DATA from the timing controller 200. The source driver 400 may convert the data signal DATA into data voltages having an analog type. The source driver 400 may output the data voltage to the data lines DL.

The emission driver 500 may generate gate signals for driving the emission lines EL in response to the third control signal CONT3 input from the timing controller 200. The emission driver 500 may output the emission signals to the emission lines EL. In an embodiment, for example, the emission driver 500 may sequentially output the emission signals to the emission lines EL.

Figure 2:
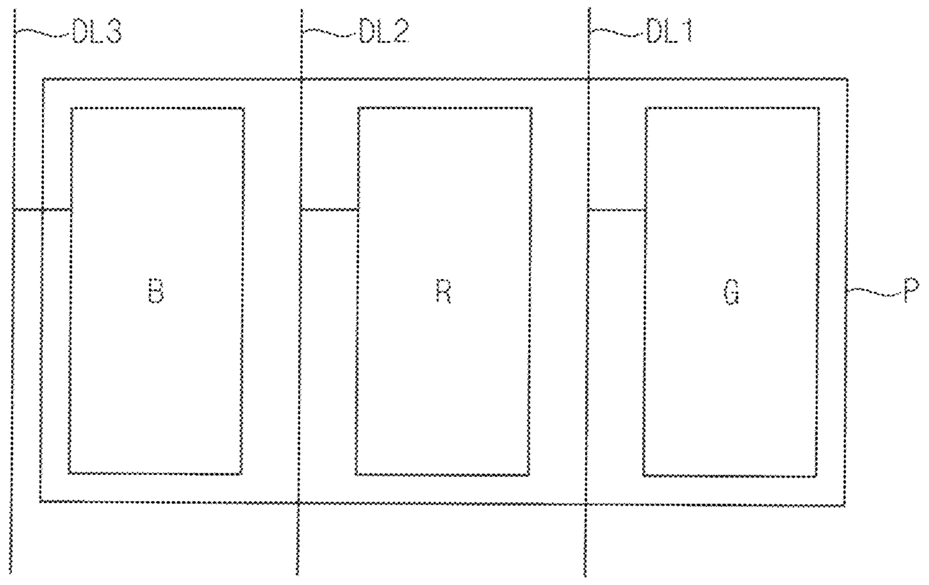
FIG. 2 is a diagram illustrating an embodiment of a pixel of the display device of FIG. 1.

FIG. 2 is a diagram illustrating an embodiment of the pixel P of the display device 1000 of FIG. 1.

Referring to FIGS. 1 and 2, in an embodiment, the pixel P may include a first sub-pixel G connected to a first data line DL1 and the gate line GL and which displays a first color, a second sub-pixel R connected to a second data line DL2 and the gate line GL and which displays a second color, and a third sub-pixel B connected to a third data line DL3 and the gate line GL and which displays a third color. In an embodiment, as shown in FIG. 2, the pixel P may have an RGB stripe structure, but is not limited thereto. In an alternative embodiment, for example, the pixel P may have an RGBG pentile structure, an RGBG diamond pentile structure, or the like.

Figure 3:
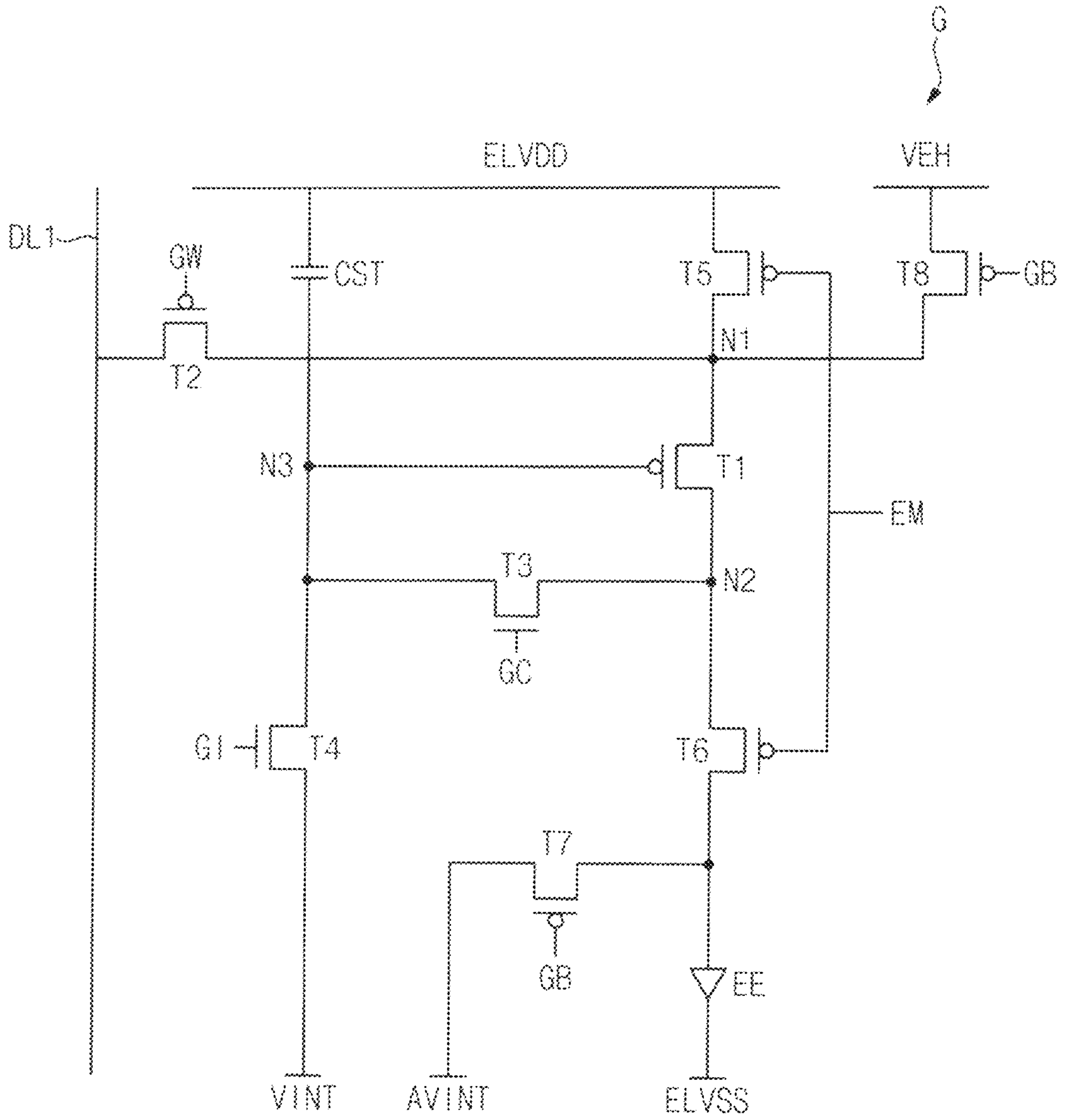
FIG. 3 is a circuit diagram illustrating an embodiment of a first sub-pixel of the display device of FIG. 1.

FIG. 3 is a circuit diagram illustrating an embodiment of a first sub-pixel of the display device 1000 of FIG. 1.

Referring to FIGS. 3, an embodiment of the first sub-pixel G may include a light emitting element EE, first to eighth transistors T1, T2, T3, T4, T5, T6, T7, and T8, and a storage capacitor CST.

For example, the first transistor T1 may include a first electrode connected to the first node N1, a second electrode connected to a second node N2, and a control electrode connected to a third node N3, the second transistor T2 may include a first electrode connected to the first data line DL1, a second electrode connected to the first node N1, and a control electrode that receives a write gate signal GW, the third transistor T3 may include a first electrode connected to the second node N2, a second electrode connected to the third node N3, and a control electrode that receives a compensation gate signal GC, the fourth transistor T4 may include a first electrode that receives an initialization voltage VINT, a second electrode connected to the third node N3, and a control electrode that receives an initialization gate signal GI, the fifth transistor T5 may include a first electrode that receives a first power voltage ELVDD, a second electrode connected to the first node N1, and a control electrode that receives the emission signal EM, the sixth transistor T6 may include a first electrode connected to the second node N2, a second electrode connected to an anode electrode of the light emitting element EE, and a control electrode that receives the emission signal EM, the seventh transistor T7 may include a first electrode that receives a second initialization voltage AVINT, a second electrode connected to the anode electrode of the light emitting element EE, and a control electrode that receives a bias gate signal GB, the eighth transistor T8 may include a first electrode that receives a bias voltage VEH, a second electrode connected to the first node N1, and a control electrode that receives the bias gate signal GB, the light emitting element EE may include the anode electrode connected to the second electrode of the sixth transistor T6 and a cathode electrode connected to a second power voltage ELVSS, and the storage capacitor CST may include a first electrode that receives the first power voltage ELVDD and a second electrode connected to the third node N3.

In an embodiment, the first transistor T1, the second transistor T2, the fifth transistor T5, the sixth transistor T6, the seventh transistor T7, and the eighth transistor T8 may be p-type transistor, and the third transistor T3 and the fourth transistor T4 may be n-type transistors. In an embodiment, for example, the third transistor T3 and the fourth transistor T4 may be oxide thin film transistors. In an embodiment, for example, the first transistor T1, the second transistor T2, the fifth transistor T5, the sixth transistor T6, the seventh transistor T7, and the eighth transistor T8 may be low-temperature poly-silicon (LTPS) thin film transistor.

The second sub-pixel R and the third sub-pixel B is substantially the same as the first sub-pixel G except that the second sub-pixel R and the third sub-pixel B are connected to the second data line DL2 and the third data line DL3, respectively, and the light emitting element EE of each of the second sub-pixel R and the third sub-pixel B emits light of a color different from that of light emitted from the light emitting element EE of the first sub-pixel G. Thus, any repetitive detailed description thereof will be omitted.

Figure 4:
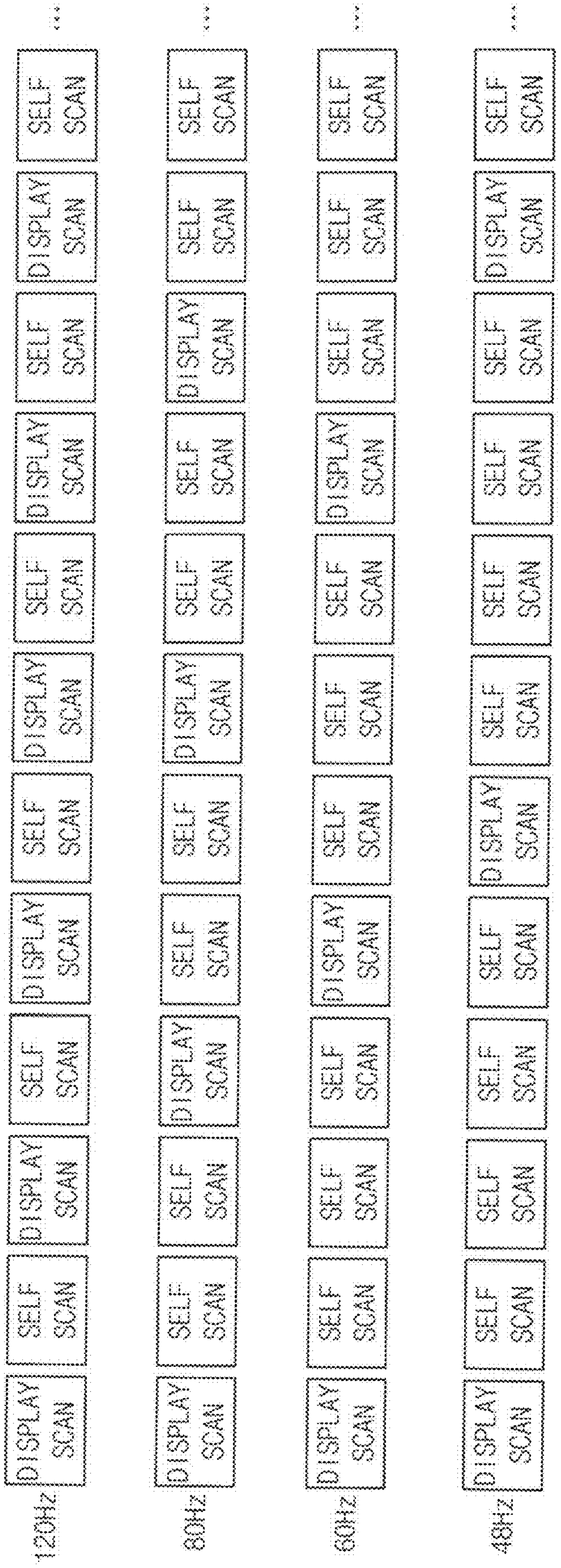
FIGS. 4 and 5 are conceptual diagrams for explaining a driving operation of the display device of FIG. 1.
Figure 5:
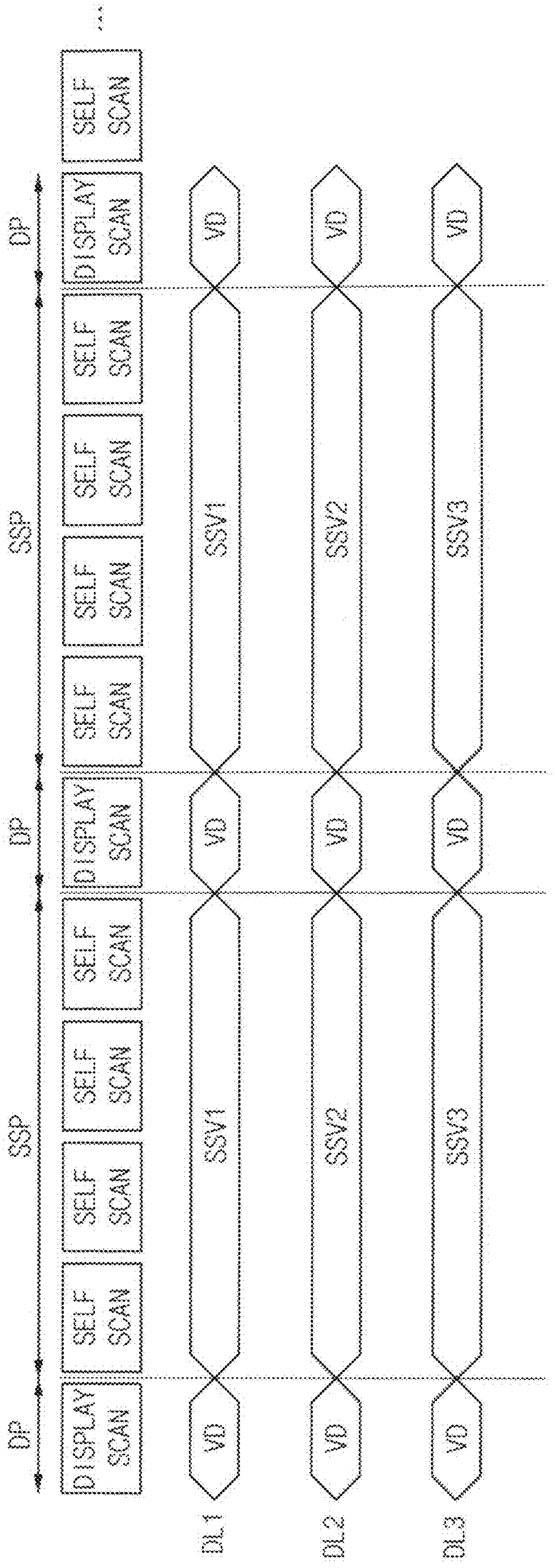
Figure 6:
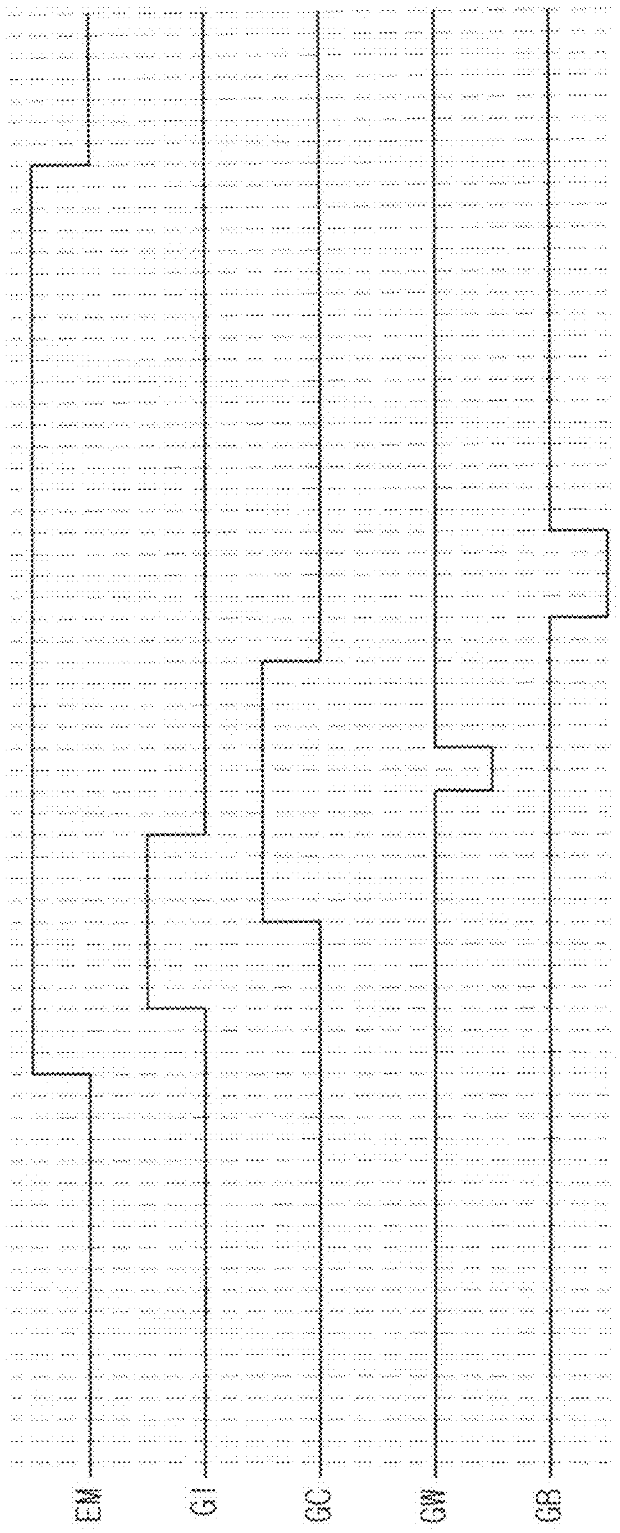
FIG. 6 is a signal timing diagram illustrating signals when the display device of FIG. 1 performs a display scan operation.
Figure 7:
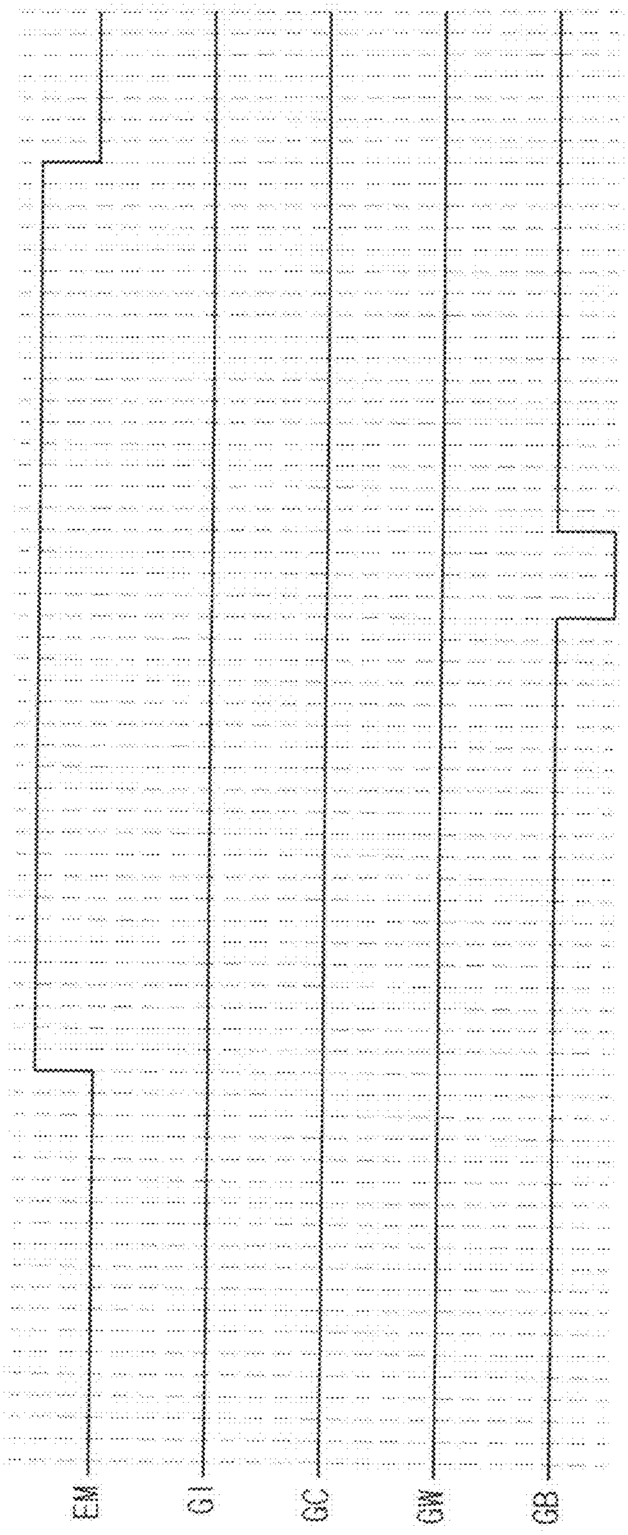
FIG. 7 is a signal timing diagram illustrating signals when the display device of FIG. 1 performs a self-scan operation.

FIGS. 4 and 5 are conceptual diagrams for explaining a driving operation of the display device 1000 of FIG. 1, FIG. 6 is a signal timing diagram illustrating signals when the display device 1000 of FIG. 1 performs a display scan operation DISPLAY SCAN, and FIG. 7 is a signal timing diagram illustrating signals when the display device 1000 of FIG. 1 performs a self-scan operation SELF SCAN.

Referring to FIGS. 1 to 5, an embodiment of the display panel 100 may be driven with a variable driving frequency (i.e., the display panel 100 may operate in a variable frame mode). A data writing operation and a light emitting operation may be performed in the display scan period DP, and a light emitting operation may be performed without the data writing operation in the self-scan period SSP. Here, the display scan period DP may be a period in which the display scan operation DISPLAY SCAN is performed, and the self-scan period SSP may be a period in which the self-scan operation SELF SCAN is performed.

The timing controller 200 may perform the display scan operation DISPLAY SCAN in one frame and the self-scan operation SELF SCAN in at least one frame at driving frequencies (i.e., 120 Hz, 80 Hz, 60 Hz, 48 Hz) excluding a maximum driving frequency of the display panel 100 (i.e., in FIG. 4, the maximum driving frequency of the display panel 100 is 240 Hz). Specifically, when the driving frequency of the display panel 100 is 120 Hz, the display scan operation DISPLAY SCAN of one frame and the self-scan operation SELF SCAN of one frame are repeated, and the display scan operation DISPLAY SCAN of one frame and the self-scan operation SELF SCAN of one frame may be one driving frame (i.e., the display device 1000 may display a same image during one driving frame). When the driving frequency of the display panel 100 is 80 Hz, the display scan operation DISPLAY SCAN of one frame and the self-scan operation SELF SCAN of two frames are repeated, and the display scan operation DISPLAY SCAN of one frame and the self-scan operation SELF SCAN of two frames may be one driving frame. When the driving frequency of the display panel 100 is 60 Hz, the display scan operation DISPLAY SCAN of one frame and the self-scan operation SELF SCAN of three frames are repeated, and the display scan operation DISPLAY SCAN of one frame and self-scan operation SELF SCAN of three frames may be one driving frame. When the driving frequency of the display panel 100 is 48 Hz, the display scan operation DISPLAY SCAN of one frame and the self-scan operation SELF SCAN of four frames are repeated, and the display scan operation DISPLAY SCAN of one frame and self-scan operation SELF SCAN of 4 frames may be one driving frame. In such an embodiment, as described above, the driving controller 200 may vary the driving frequency (or a length of the driving frame) of the display panel 100 by adjusting a length of the self-scan operation SELF SCAN, i.e., display panel may operate in the variable frame mode.

The source driver 400 may provide the data voltage VD to the first data line DL1 in the display scan period DP and the first self-scan voltage SSV1 to the first data line DL1 in the self-scan period SSP. The source driver 400 may provide the data voltage VD to the second data line DL2 in the display scan period DP and the second self-scan voltage SSV2 to the second data line DL2 in the self-scan period SSP. The source driver 400 may provide the data voltage VD to the third data line DL3 in the display scan period DP and the third self-scan voltage SSV3 to the third data line DL3 in the self-scan period SSP.

FIGS. 3, 6, and 7, when the display scan operation DISPLAY SCAN is performed, the data voltage VD may be written to the storage capacitor Cst (i.e., a data writing operation), and the light emitting device EE may be emit light (i.e., a light emitting operation). When the self-scan operation SELF SCAN is performed, the second transistor T2, the third transistor T3, and the fourth transistor T4 may be turned off. Accordingly, when the self-scan operation SELF SCAN is performed, the light emitting operation may be performed without the data writing operation.

In an embodiment, for example, referring to FIGS. 3 and 6, when the display scan operation DISPLAY SCAN is performed, the fourth transistor T4 may be turned on in response to the initialization gate signal GI, and the first initialization voltage VINT may be applied to the third node N3 (i.e., the control electrode of the first transistor T1). Accordingly, the control electrode of the first transistor T1 may be initialized to the first initialization voltage VINT. In addition, when the display scan operation DISPLAY SCAN is performed, the third transistor T3 may be turned on in response to the compensation gate signal GC, and the second transistor T2 may be turned on in response to the write gate signal GW. Accordingly, the data voltage VD may be written to the storage capacitor CST. In addition, when the display scan operation DISPLAY SCAN is performed, the seventh transistor T7 and the eighth transistor T8 may be turned on in response to the bias gate signal GB. Accordingly, the anode electrode of the light emitting element EE may be initialized to the second initialization voltage AVINT, and a hysteresis characteristic of the first transistor T1 may be initialized by applying the bias voltage VEH to the first node N1. In addition, when the display scan operation DISPLAY SCAN is performed, the fifth transistor T5 and the sixth transistor T6 may be turned on in response to the emission signal EM. Accordingly, the light emitting element EE may receive a driving current from the first transistor T1 and emit light.

In an embodiment, for example, referring to FIGS. 3 and 7, when the self-scan operation SELF SCAN is performed, the initialization gate signal GI, the compensation gate signal GC, and the write gate signal GW have an inactivation level. Therefore, the second transistor T2, the third transistor T3, and the fourth transistor T4 may be turned off. Accordingly, the data writing operation of writing the data voltage VD to the storage capacitor CST may not be performed. In addition, when the self-scan operation SELF SCAN is performed, the seventh transistor T7 and the eighth transistor T8 may be turned on in response to the bias gate signal GB. Accordingly, the anode electrode of the light emitting element EE may be initialized to the second initialization voltage AVINT, and the hysteresis characteristic of the first transistor T1 may be initialized by applying the bias voltage VEH to the first node N1. In addition, when the self-scan operation SELF SCAN is performed, the fifth transistor T5 and the sixth transistor T6 may be turned on in response to the emission signal EM. Accordingly, the light emitting element EE may receive the driving current from the first transistor T1 and emit light.

Figure 8:
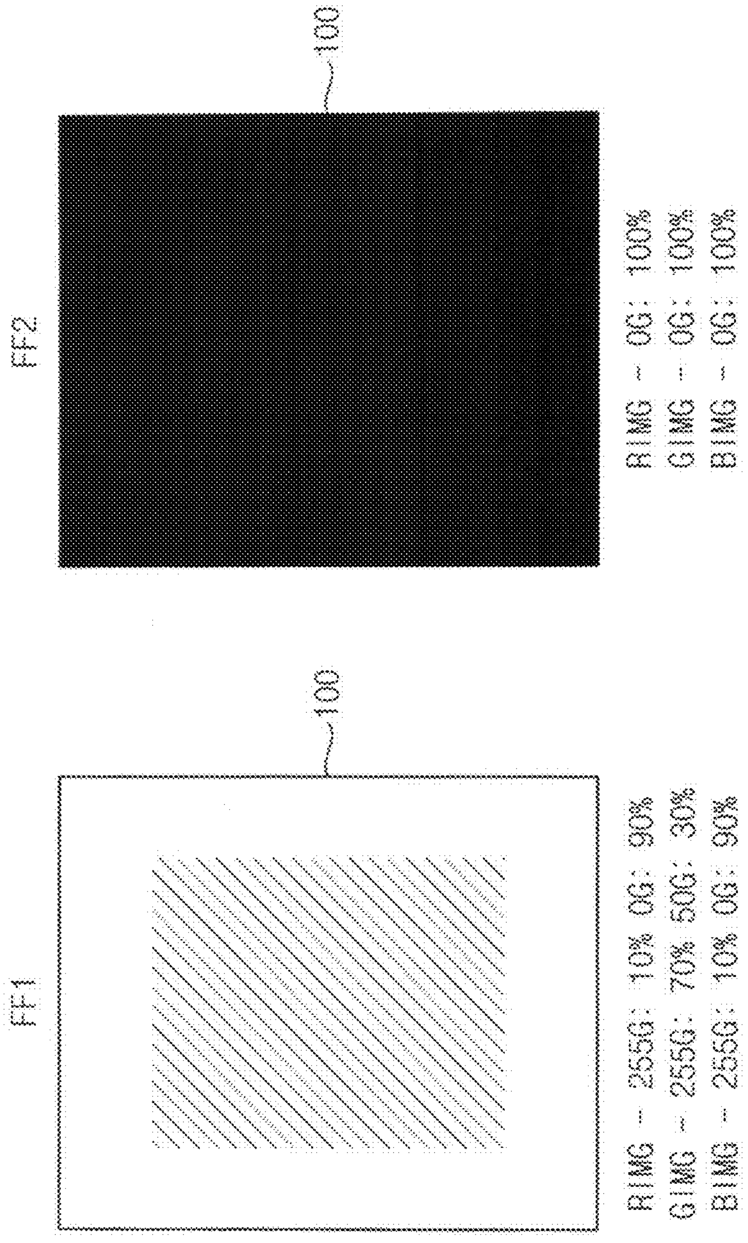
FIG. 8 is a diagram illustrating an example of an image displayed on a display panel of the display device of FIG. 1.
Figure 9:
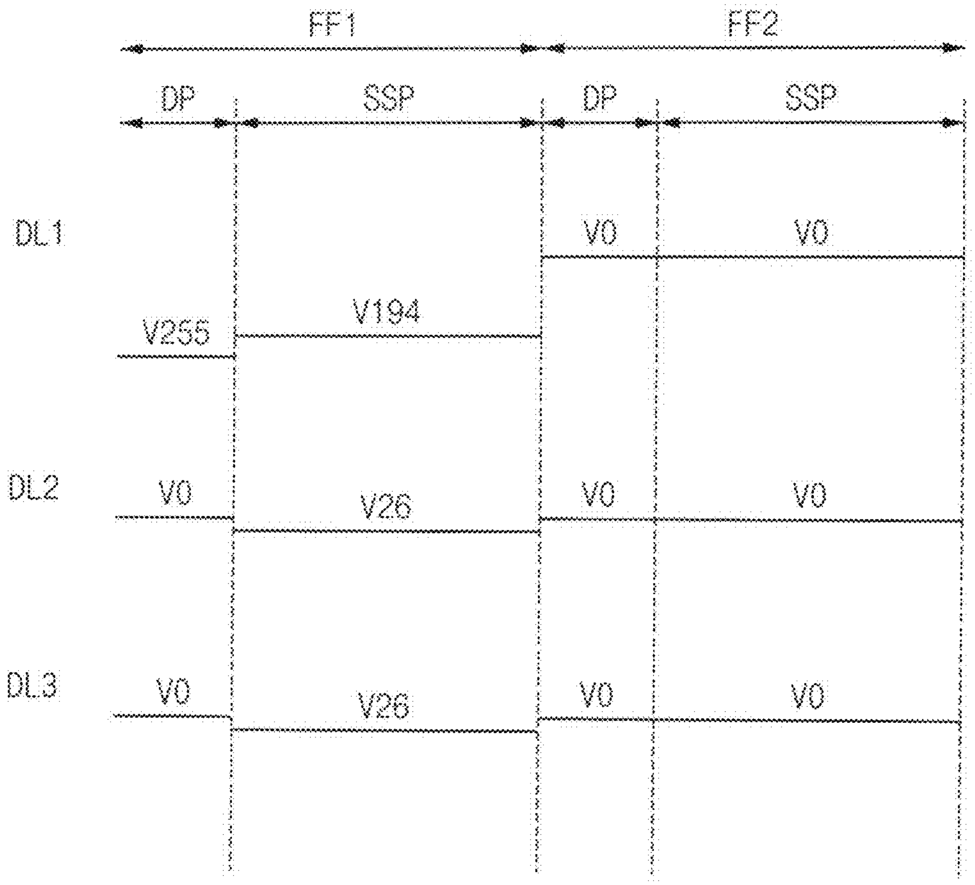
FIG. 9 is a diagram illustrating a data voltage and a self-scan voltage of the display device of FIG. 1.

FIG. 8 is a diagram illustrating an example of an image displayed on the display panel 100 of the display device 1000 of FIG. 1, and FIG. 9 is a diagram illustrating the data voltage VD and the self-scan voltage SSV1, SSV2, and SVV3 of the display device 1000 of FIG. 1.

Referring to FIGS. 1, 5, 8, and 9, in an embodiment, the input image data IMG may include first color image data GIMG for the first color and second color image data RIMG for the second color, and third color image data BIMG for the third color. The timing controller 200 may calculate a first ratio of each of the grayscale values of the first color image data GIMG and determine the first self-scan voltage SSV1 based on the first ratio. The timing controller 200 may calculate a second ratio of each of the grayscale values of the second color image data RIMG and determine the second self-scan voltage SSV2 based on the second ratio. The timing controller 200 may calculate a third ratio of each of the grayscale values of the third color image data BIMG and determine the third self-scan voltage SSV3 based on the third ratio. In an embodiment, for example, the first color may be a green color, the second color may be a red color, and the third color may be a blue color.

In an embodiment, the timing controller may determine a sum of products of a grayscale voltage corresponding to each of the grayscale values of the first color image data GIMG and the first ratio as the first self-scan voltage SSV1, may determine a voltage corresponding to (or substantially equal to) a sum of products of a grayscale voltage corresponding to each of the grayscale values of the second color image data RIMG and the first ratio as the second self-scan voltage SSV2, and may determine a voltage corresponding to (or substantially equal to) a sum of products of a grayscale voltage corresponding to each of the grayscale values of the third color image data BIMG and the first ratio as the third self-scan voltage SSV3. The grayscale voltage may be the data voltage applied to the sub-pixels R, G, and B to display a corresponding grayscale value.

In an embodiment, for example, as shown in FIG. 8, in a case where the input image data IMG applied in a first driving frame FF1 includes the first color image data GIMG including 70% of 255 grayscale value 255G and 30% of 50 grayscale value 50G, the second color image data RIMG including 10% of 255 grayscale value 255G and 90% of 0 grayscale value 0G, and the third color image data BIMG 10% of 255 grayscale value 255G and 90% of 0 grayscale value, a sum of product of the grayscale voltage V255 corresponding to 255 grayscale value and 0.7 and product of the grayscale voltage V50 corresponding to 50 grayscale value and 0.3 is substantially equal to the grayscale voltage V194 corresponding to 194 grayscale value, and a sum of product of the grayscale voltage V255 corresponding to 255 grayscale value and 0.1 and product of the grayscale voltage V50 corresponding to 50 grayscale value and 0.9 is substantially equal to the grayscale voltage V25 corresponding to grayscale value. In the first driving frame FF1, the first ratio of 255 grayscale values 255G may be 0.7 and the first ratio of 50 grayscale values 50G may be 0.3, so the first self-scan voltage SSV1 may be the grayscale voltage V194 corresponding to 194 grayscale value. In the first driving frame FF1, the second ratio of 255 grayscale values 255G may be and the second ratio of 0 grayscale value 0G may be 0.9, so the second self-scan voltage SSV1 may be the grayscale voltage V26 corresponding to 26 grayscale value. In the first driving frame FF1, the third ratio of the 255 grayscale value 255G is 0.1 and the third ratio of the 0 grayscale value 0G is 0.9, so the third self-scan voltage SSV3 may be the grayscale voltage V26 corresponding to 26 grayscale value.

In an embodiment, for example, as shown in FIG. 8, in a case where the input image data IMG applied in the second driving frame FF2 following the first driving frame FF1 includes 100% of 0 grayscale value 0G. In the second driving frame FF2, since the input image data IMG includes 100% of 0 grayscale value, the first self-scan voltage SSV1, the second self-scan voltage SSV2, and the third self-scan voltage SSV3 may be the grayscale voltage V0 corresponding to 0 grayscale value.

In an embodiment, for example, as shown in FIG. 9, in the first driving frame FF1, the first self-scan voltage SSV1 may be the grayscale voltage V194 corresponding to 194 grayscale value, the second self-scan voltage SSV2 may be the grayscale voltage V26 corresponding to 26 grayscale value, and the third self-scan voltage SSV3 may be the grayscale voltage V26 corresponding to 26 grayscale value. Accordingly, in the display scan period DP of the first driving frame FF1, the source driver 400 may apply the grayscale voltage V255 corresponding to 255 grayscale value to the first data line DL1 as the data voltage VD, may apply the grayscale voltage V0 corresponding to 0 grayscale value to the second data line DL2 as the data voltage VD, and may apply the grayscale voltage V0 corresponding to 0 grayscale value to the third data line DL3 as the data voltage VD. And, in the self-scan period SSP of the first driving frame FF1, the source driver 400 may apply the grayscale voltage V194 corresponding to the 194 grayscale value to the first data line DL1 as the first self-scan voltage SSV1, may apply the grayscale voltage V26 corresponding to 26 grayscale value to the second data line DL2 as the second self-scan voltage SSV2, and may apply the grayscale voltage V26 corresponding to 26 grayscale value to the third data line DL3 as the third self-scan voltage SSV3. Also, in the display scan period DP of the second driving frame FF2, the source driver 400 may apply the grayscale voltage V0 corresponding to 0 grayscale value to the first data line DL1 as the data voltage VD, may apply the grayscale voltage V0 corresponding to 0 grayscale value to the second data line DL2 as the data voltage VD, and may apply the grayscale voltage V0 corresponding to 0 grayscale value to the third data line DL3 as the data voltage VD. In the self-scan period SSP of the second driving frame FF2, the source driver 400 may apply the grayscale voltage V0 corresponding to 0 grayscale value to the first data line DL1 as the first self-scan voltage SSV1, may apply the grayscale voltage V0 corresponding to 0 grayscale value to the second data line DL2 as the second self-scan voltage SSV2, and may apply the grayscale voltage V0 corresponding to 0 grayscale value to the third data line DL3 as the third self-scan voltage SSV3.

Accordingly, an embodiment of the display device 1000 of FIG. 1 may minimize a difference between the data voltage VD and the self-scan voltage SSV1, SSV2, and SSV3 by determining the self-scan voltage SSV1, SSV2, and SSV3 based on the grayscale value of the input image data IMG. Accordingly, in such an embodiment the display device 1000 may minimize a voltage change of the anode electrode of the light emitting element EE caused by coupling between the anode electrode of the light emitting element EE and the data line (DL1, DL2, DL3; DL).

Figure 10:
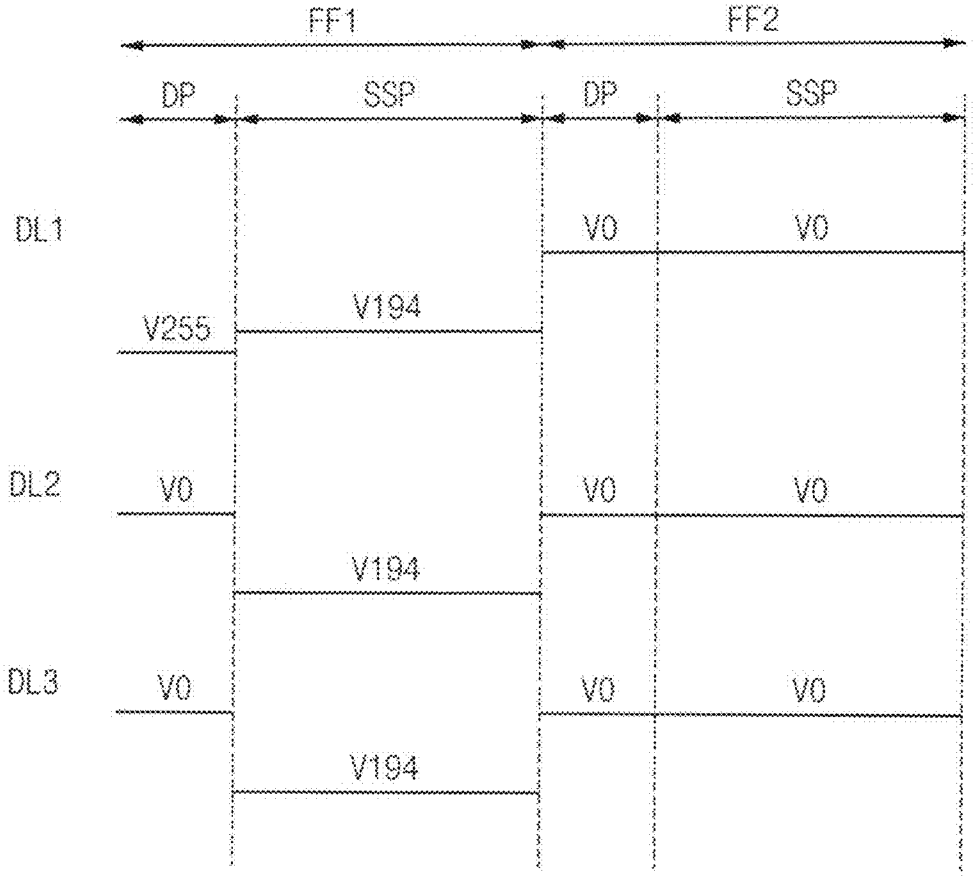
FIG. 10 is a diagram illustrating a data voltage and a self-scan voltage of a display device according to embodiments of the invention.

FIG. 10 is a diagram illustrating the data voltage VD and the self-scan voltage SSV1, SSV2, and SSV3 of a display device according to embodiments of the invention.

The display device according to the embodiment shown in FIG. 10 is substantially the same as the embodiment of the display device 1000 of FIG. 1 except for the second self-scan voltage SSV2 and the third self-scan voltage SSV3. Thus, the same reference numerals are used to refer to the same or similar elements, and any repetitive detailed description thereof will be omitted.

Referring to FIGS. 1, 5, 8, and 10, the timing controller 200 may determine the second self-scan voltage SSV2 and the third self-scan voltage SSV3 based on the first ratio. The first color may be a green color.

In an embodiment, the timing controller 200 may determine a sum of products of the grayscale voltage corresponding to each of the grayscale values of the first color image data GIMG and the first ratio as the first self-scan voltage SSV1, the second self-scan voltage SSV2, and the third self-scan voltage SSV3.

In an embodiment, for example, as shown in FIG. 8, in a case where the input image data IMG applied in a first driving frame FF1 includes the first color image data GIMG including 70% of 255 grayscale value 255G and 30% of 50 grayscale value 50G, the second color image data RIMG including 10% of 255 grayscale value 255G and 90% of 0 grayscale value 0G, and the third color image data BIMG 10% of 255 grayscale value 255G and 90% of 0 grayscale value, a sum of product of the grayscale voltage V255 corresponding to 255 grayscale value and 0.7 and product of the grayscale voltage V50 corresponding to 50 grayscale value and 0.3 is equal to the grayscale voltage V194 corresponding to 194 grayscale value, and a sum of product of the grayscale voltage V255 corresponding to 255 grayscale value and 0.1 and product of the grayscale voltage V50 corresponding to 50 grayscale value and 0.9 is equal to the grayscale voltage V25 corresponding to 25 grayscale value. In the first driving frame FF1, the first ratio of 255 grayscale values 255G may be and the first ratio of 50 grayscale values 50G may be 0.3, so each of the first self-scan voltage SSV1, the second self-scan voltage SSV2, and the third self-scan voltage SSV3 may be the grayscale voltage V194 corresponding to 194 grayscale value.

In an embodiment, for example, as shown in FIG. 8, the input image data IMG applied in the second driving frame FF2 following the first driving frame FF1 may include 100% of 0 grayscale value 0G. In the second driving frame FF2, since the input image data IMG includes 100% of 0 grayscale value 0G, each of the first self-scan voltage SSV1, the second self-scan voltage SSV2, and the third self-scan voltage SSV3 may be the grayscale voltage V0 corresponding to 0 grayscale value.

In an embodiment, for example, in the first driving frame FF1, the first self-scan voltage SSV1, the second self-scan voltage SSV2, and the third self-scan voltage SSV3 may be the grayscale voltage V194 corresponding to 194 grayscale value. Accordingly, in the display scan period DP of the first driving frame FF1, the source driver 400 may apply the grayscale voltage V255 corresponding to 255 grayscale value to the first data line DL1 as the data voltage VD, may apply the grayscale voltage V0 corresponding to 0 grayscale value to the second data line DL2 as the data voltage VD, and may apply the grayscale voltage V0 corresponding to 0 grayscale value to the third data line DL3 as the data voltage VD. And, in the self-scan period SSP of the first driving frame FF1, the source driver 400 may apply the grayscale voltage V194 corresponding to the 194 grayscale value to the first data line DL1 as the first self-scan voltage SSV1, may apply the grayscale voltage V194 corresponding to 194 grayscale value to the second data line DL2 as the second self-scan voltage SSV2, and may apply the grayscale voltage V194 corresponding to 194 grayscale value to the third data line DL3 as the third self-scan voltage SSV3. Also, in the display scan period DP of the second driving frame FF2, the source driver 400 may apply the grayscale voltage V0 corresponding to 0 grayscale value to the first data line DL1 as the data voltage VD, may apply the grayscale voltage V0 corresponding to 0 grayscale value to the second data line DL2 as the data voltage VD, and may apply the grayscale voltage V0 corresponding to 0 grayscale value to the third data line DL3 as the data voltage VD. In the self-scan period SSP of the second driving frame FF2, the source driver 400 may apply the grayscale voltage V0 corresponding to 0 grayscale value to the first data line DL1 as the first self-scan voltage SSV1, may apply the grayscale voltage V0 corresponding to 0 grayscale value to the second data line DL2 as the second self-scan voltage SSV2, and may apply the grayscale voltage V0 corresponding to 0 grayscale value to the third data line DL3 as the third self-scan voltage SSV3.

Accordingly, an embodiment of the display device 1000, as described above with reference to FIG. 10, may determine the self-scan voltage SSV1, SSV2, and SSV3 based on the grayscale value of the first color image data GIMG for a green color, which has the highest human color sensitivity.

Figure 11:
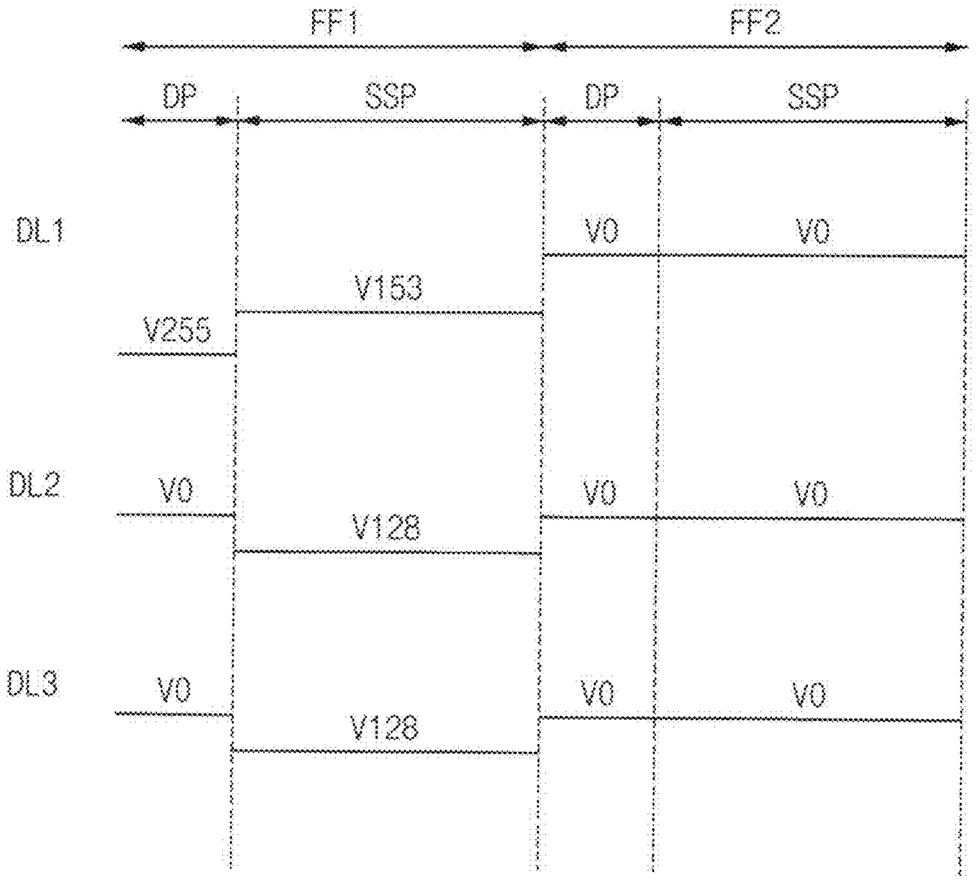
FIG. 11 is a diagram illustrating a data voltage and a self-scan voltage of a display device according to embodiments of the invention.

FIG. 11 is a diagram illustrating the data voltage VD and the self-scan voltage SSV1, SSV2, and SSV3 of a display device according to embodiments of the invention.

The display device according to the embodiment shown in FIG. 11 is substantially the same as the embodiment of the display device 1000 of FIG. 1 except for the self-scan voltage SSV1, SSV2, and SSV3. Thus, the same reference numerals are used to refer to the same or similar elements, and any repetitive detailed description thereof will be omitted.

Referring to FIGS. 1, 5, 8, and 11, in an embodiment, the timing controller 200 may determine the first self-scan voltage SSV1 based on a first average grayscale value of different grayscale values of the first color image data GIMG, may determine the second self-scan voltage SSV2 based on a second average grayscale value of different grayscale values of the second color image data RIMG, and may determine the third self-scan voltage SSV3 based on a third average grayscale value of different grayscale values of the third color image data BIMG. The first average grayscale, the second average grayscale, and the third average grayscale may be values determined regardless (or independently) of the ratio of the grayscale values. In an embodiment, for example, the first average grayscale value may be a value obtained by dividing a sum of the different grayscale values of the first color image data GIMG by the number of the different grayscale values of the first color image data GIMG.

In an embodiment, the timing controller 200 may determine the grayscale voltage corresponding to the first average grayscale as the first self-scan voltage SSV1, may determine the grayscale voltage corresponding to the second average grayscale to the second self-scan voltage SSV2, and may determine the grayscale voltage corresponding to the third average grayscale as the third self-scan voltage SSV3. In an embodiment, when the first average grayscale, the second average grayscale, or the third average grayscale includes a decimal point, the timing controller 200 may determine the grayscale voltage corresponding to the rounded grayscale value as the self-scan voltage SSV1, SSV2, and SSV3.

In an embodiment, for example, as shown in FIG. 8, in a case where the input image data IMG applied in a first driving frame FF1 includes the first color image data GIMG including 70% of 255 grayscale value 255G and 30% of 50 grayscale value 50G, the second color image data RIMG including 10% of 255 grayscale value 255G and 90% of 0 grayscale value 0G, and the third color image data BIMG 10% of 255 grayscale value 255G and 90% of 0 grayscale value, a sum of product of the grayscale voltage V255 corresponding to 255 grayscale value and 0.7 and product of the grayscale voltage V50 corresponding to 50 grayscale value and 0.3 is equal to the grayscale voltage V194 corresponding to 194 grayscale value. In the first driving frame FF1, since the first average grayscale value is (255+50)/2=152.5, the first self-scan voltage SSV1 may be the grayscale voltage V153 corresponding to 153 grayscale value. In the first driving frame FF1, since the second average grayscale value is (255+0)/2=127.5, the second self-scan voltage SSV2 may be the grayscale voltage V128 corresponding to the 128 grayscale. In the first driving frame FF1, since the third average grayscale is (255+0)/2=127.5, the third self-scan voltage SSV3 may be the grayscale voltage V128 corresponding to the 128 grayscale value.

In an embodiment, for example, as shown in FIG. 8, the input image data IMG applied in the second driving frame FF2 following the first driving frame FF1 may include 100% of 0 grayscale value 0G. In the second driving frame FF2, since the input image data IMG includes 100% of 0 grayscale value, the first self-scan voltage SSV1, the second self-scan voltage SSV2, and the third self-scan voltage SSV3 may be the grayscale voltage V0 corresponding to 0 grayscale value.

In an embodiment, for example, in the first driving frame FF1, the first self-scan voltage SSV1 may be the grayscale voltage V153 corresponding to 153 grayscale value, the second self-scan voltage SSV2 may be the grayscale voltage V128 corresponding to 128 grayscale value, and the third self-scan voltage SSV3 may be the grayscale voltage V128 corresponding to 128 grayscale value. Accordingly, in the display scan period DP of the first driving frame FF1, the source driver 400 may apply the grayscale voltage V255 corresponding to 255 grayscale value to the first data line DL1 as the data voltage VD, may apply the grayscale voltage V0 corresponding to 0 grayscale value to the second data line DL2 as the data voltage VD, and may apply the grayscale voltage V0 corresponding to 0 grayscale value to the third data line DL3 as the data voltage VD. And, in the self-scan period SSP of the first driving frame FF1, the source driver 400 may apply the grayscale voltage V153 corresponding to the 153 grayscale value to the first data line DL1 as the first self-scan voltage SSV1, may apply the grayscale voltage V128 corresponding to 128 grayscale value to the second data line DL2 as the second self-scan voltage SSV2, and may apply the grayscale voltage V128 corresponding to 128 grayscale value to the third data line DL3 as the third self-scan voltage SSV3. Also, in the display scan period DP of the second driving frame FF2, the source driver 400 may apply the grayscale voltage V0 corresponding to 0 grayscale value to the first data line DL1 as the data voltage VD, may apply the grayscale voltage V0 corresponding to 0 grayscale value to the second data line DL2 as the data voltage VD, and may apply the grayscale voltage V0 corresponding to 0 grayscale value to the third data line DL3 as the data voltage VD. In the self-scan period SSP of the second driving frame FF2, the source driver 400 may apply the grayscale voltage V0 corresponding to 0 grayscale value to the first data line DL1 as the first self-scan voltage SSV1, may apply the grayscale voltage V0 corresponding to 0 grayscale value to the second data line DL2 as the second self-scan voltage SSV2, and may apply the grayscale voltage V0 corresponding to 0 grayscale value to the third data line DL3 as the third self-scan voltage SSV3.

Figure 12:
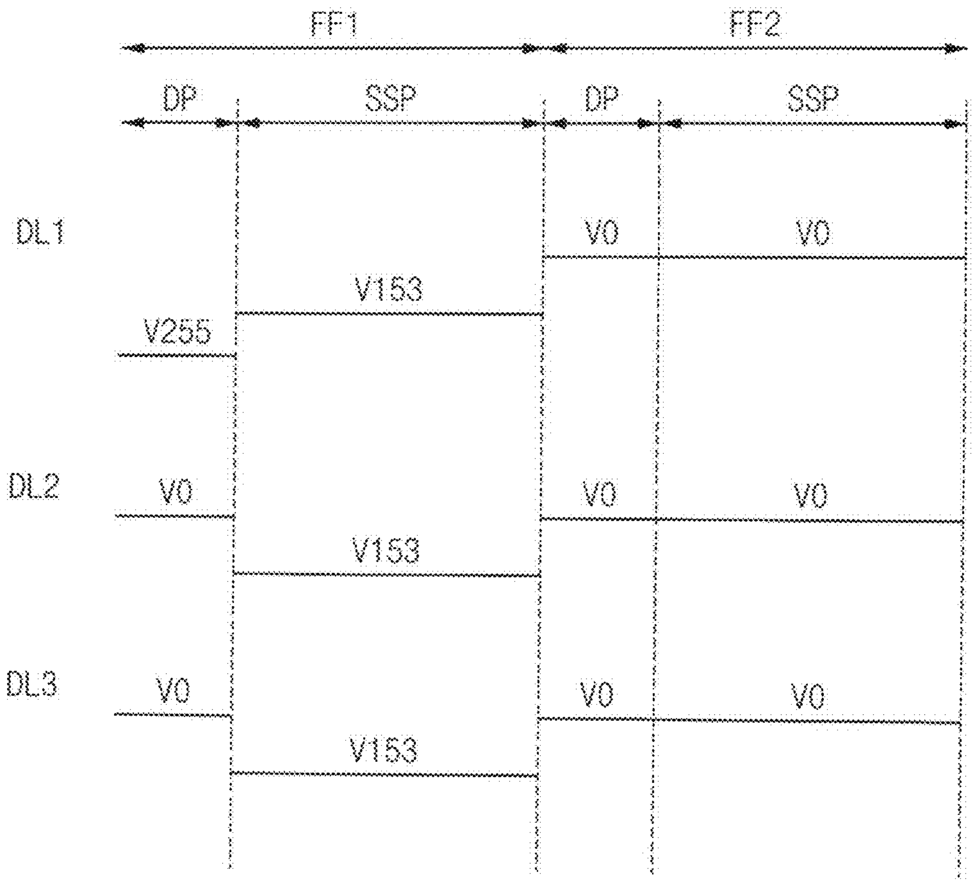
FIG. 12 is a diagram illustrating a data voltage and a self-scan voltage of a display device according to embodiments of the invention.

FIG. 12 is a diagram illustrating the data voltage VD and the self-scan voltage SSV1, SSV2, and SSV3 of a display device according to embodiments of the invention.

The display device according to the embodiment shown in FIG. 12 is substantially the same as the embodiment of the display device of FIG. 11 except for the second self-scan voltage SSV2 and the third self-scan voltage SSV3. Thus, the same reference numerals are used to refer to the same or similar elements, and any repetitive detailed description thereof will be omitted.

Referring to FIGS. 1, 5, 8, and 12, in an embodiment, the timing controller 200 may determine the second self-scan voltage SSV2 and the third self-scan voltage SSV3 based on the first average grayscale value of different grayscale values of the first color image data GIMG for the first color.

In an embodiment, the timing controller 200 may determine the grayscale voltage corresponding to the first average grayscale as the first self-scan voltage SSV1, the second self-scan voltage SSV2, and the third self-scan voltage SSV3. In an embodiment, when the first average grayscale includes a decimal point, the timing controller 200 may determine the grayscale voltage corresponding to the rounded grayscale value as the self-scan voltage SSV1, SSV2, and SSV3.

In an embodiment, for example, as shown in FIG. 8, in a case where the input image data IMG applied in a first driving frame FF1 includes the first color image data GIMG including 70% of 255 grayscale value 255G and 30% of 50 grayscale value 50G, the second color image data RIMG including 10% of 255 grayscale value 255G and 90% of 0 grayscale value 0G, and the third color image data BIMG 10% of 255 grayscale value 255G and 90% of 0 grayscale value, a sum of product of the grayscale voltage V255 corresponding to 255 grayscale value and 0.7 and product of the grayscale voltage V50 corresponding to 50 grayscale value and 0.3 is equal to the grayscale voltage V194 corresponding to 194 grayscale value. In the first driving frame FF1, since the first average grayscale value is (255+50)/2=152.5, the first self-scan voltage SSV1, the second self-scan voltage SSV2, and the third self-scan voltage SSV3 may be the grayscale voltage V153 corresponding to 153 grayscale value.

In an embodiment, for example, as shown in FIG. 8, the input image data IMG applied in the second driving frame FF2 following the first driving frame FF1 may include 100% of 0 grayscale value 0G. In the second driving frame FF2, since the input image data IMG includes 100% of 0 grayscale value, the first self-scan voltage SSV1, the second self-scan voltage SSV2, and the third self-scan voltage SSV3 may be the grayscale voltage V0 corresponding to 0 grayscale value.

In an embodiment, for example, in the first driving frame FF1, the first self-scan voltage SSV1, the second self-scan voltage SSV2, and the third self-scan voltage SSV3 may be the grayscale voltage V153 corresponding to 153 grayscale value. Accordingly, in the display scan period DP of the first driving frame FF1, the source driver 400 may apply the grayscale voltage V255 corresponding to 255 grayscale value to the first data line DL1 as the data voltage VD, may apply the grayscale voltage V0 corresponding to 0 grayscale value to the second data line DL2 as the data voltage VD, and may apply the grayscale voltage V0 corresponding to 0 grayscale value to the third data line DL3 as the data voltage VD. And, in the self-scan period SSP of the first driving frame FF1, the source driver 400 may apply the grayscale voltage V153 corresponding to the 153 grayscale value to the first data line DL1 as the first self-scan voltage SSV1, may apply the grayscale voltage V153 corresponding to 153 grayscale value to the second data line DL2 as the second self-scan voltage SSV2, and may apply the grayscale voltage V153 corresponding to 153 grayscale value to the third data line DL3 as the third self-scan voltage SSV3. Also, in the display scan period DP of the second driving frame FF2, the source driver 400 may apply the grayscale voltage V0 corresponding to 0 grayscale value to the first data line DL1 as the data voltage VD, may apply the grayscale voltage V0 corresponding to 0 grayscale value to the second data line DL2 as the data voltage VD, and may apply the grayscale voltage V0 corresponding to 0 grayscale value to the third data line DL3 as the data voltage VD. In the self-scan period SSP of the second driving frame FF2, the source driver 400 may apply the grayscale voltage V0 corresponding to 0 grayscale value to the first data line DL1 as the first self-scan voltage SSV1, may apply the grayscale voltage V0 corresponding to 0 grayscale value to the second data line DL2 as the second self-scan voltage SSV2, and may apply the grayscale voltage V0 corresponding to 0 grayscale value to the third data line DL3 as the third self-scan voltage SSV3.

Figure 13:
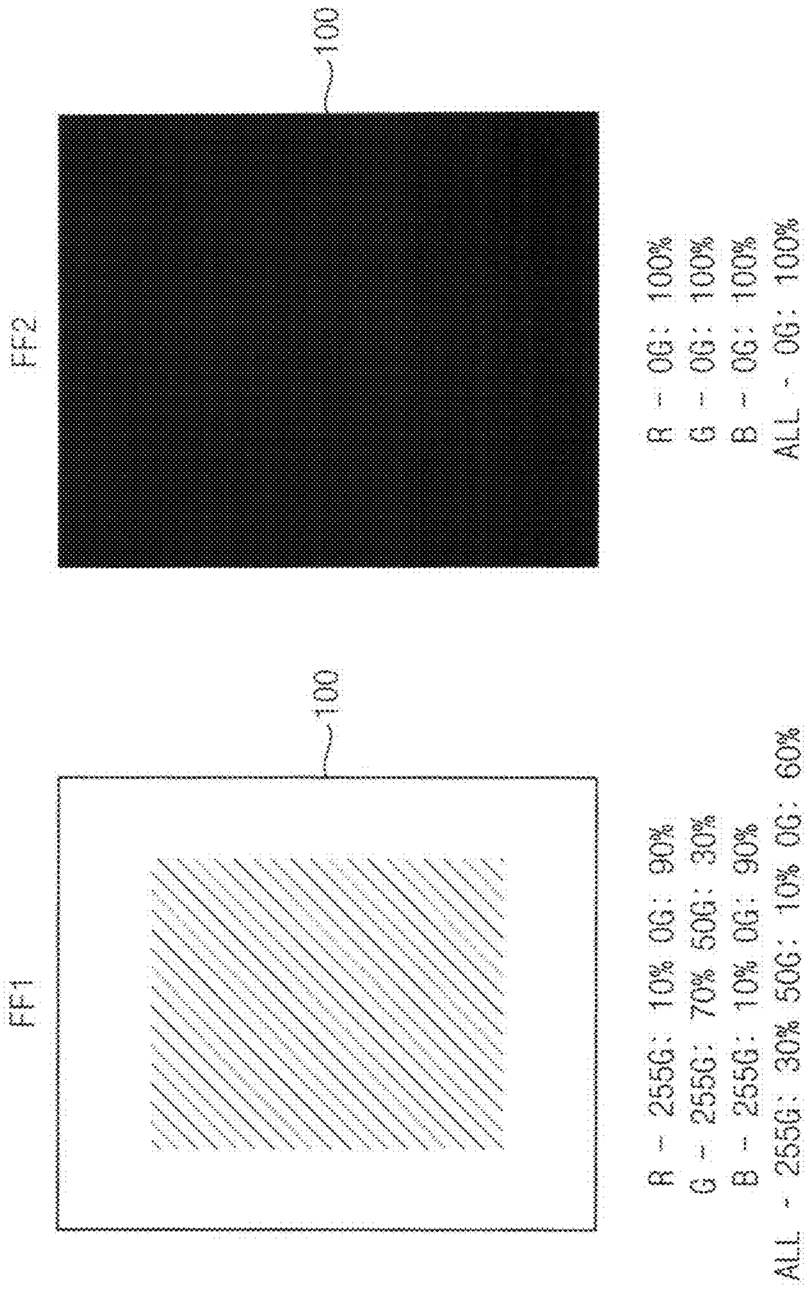
FIG. 13 is a diagram illustrating an example of an image displayed on a display panel of a display device according to embodiments of the invention.
Figure 14:
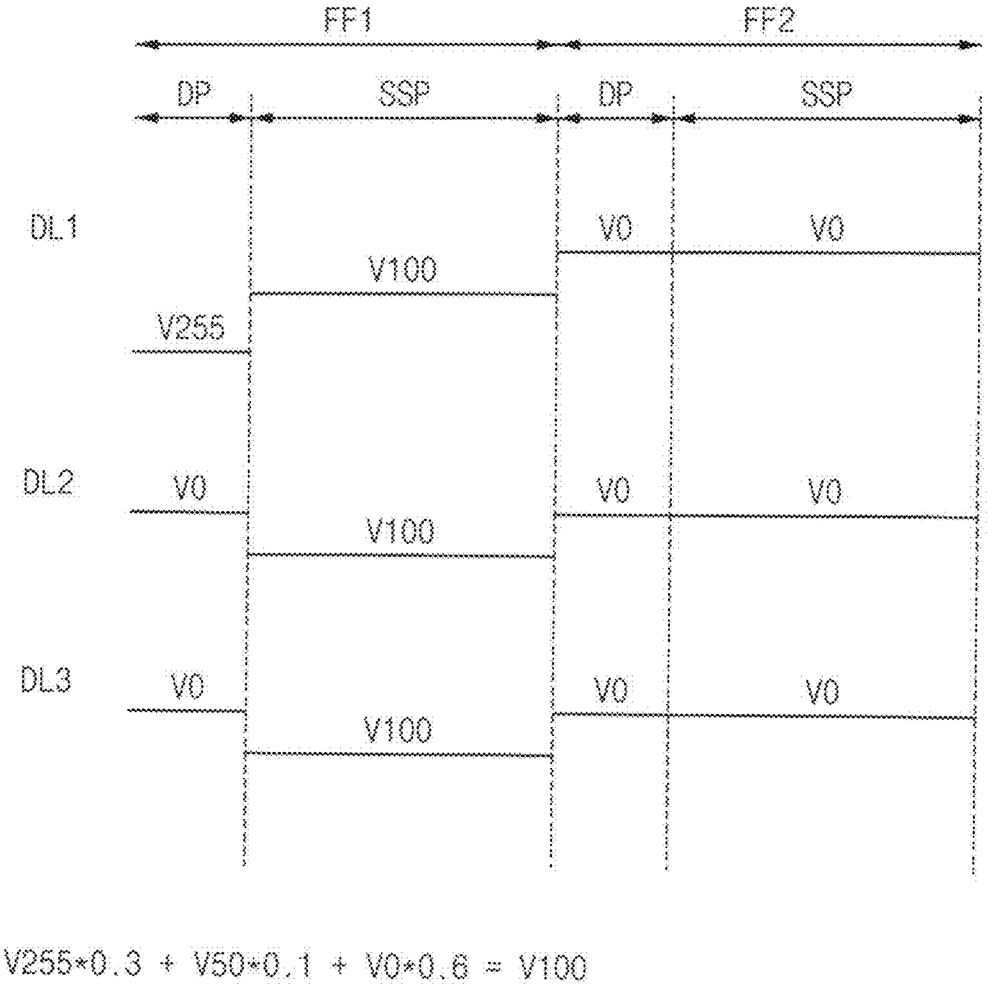
FIG. 14 is a diagram illustrating a data voltage and a self-scan voltage of the display device of FIG. 13.

FIG. 13 is a diagram illustrating an example of an image displayed on the display panel 100 of a display device according to embodiments of the invention, and FIG. 14 is a diagram illustrating the data voltage VD and the self-scan voltage SSV1, SSV2, and SSV3 of the display device of FIG. 13.

The display device according to the embodiment shown in FIGS. 13 and 14 is substantially the same as the embodiment of the display device 1000 of FIG. 1 except for the data voltage VD and the self-scan voltage SSV1, SSV2, and SSV3. Thus, the same reference numerals are used to refer to the same or similar elements, and any repetitive detailed description thereof will be omitted.

Referring to FIGS. 1, 5, 13, and 14, in an embodiment, the timing controller 200 may calculate a ratio of each of the grayscale values of the input image data IMG and may determine the first self-scan voltage SSV1 based on the ratio. In an embodiment, the timing controller 200 may determine the second self-scan voltage SSV2 and the third self-scan voltage SSV3 based on the ratio of each of the grayscale values of the input image data IMG.

In an embodiment, the timing controller 200 may determine a sum of products of the grayscale voltage corresponding to each of the grayscale values of the input image data IMG and the ratio as the first self-scan voltage SSV1.

In an embodiment, the timing controller 200 may determine the sum of products of the grayscale voltage corresponding to each of the grayscale values of the input image data IMG and the ratio as the second self-scan voltage SSV1 and the third self-scan voltage SSV3.

In an embodiment, for example, as shown in FIG. 13, in a case where the input image data IMG applied in a first driving frame FF1 includes 30% of 255 grayscale value 255G, 10% of 50 grayscale value 50G, and 60% of 0 grayscale value 0G, a sum of product of the grayscale voltage V255 corresponding to 255 grayscale value and 0.3, product of the grayscale voltage V50 corresponding to 50 grayscale value and 0.1, and product of the grayscale voltage V0 corresponding to 0 grayscale value and 0.6 is equal to the grayscale voltage V100 corresponding to 100 grayscale value. In the first driving frame FF1, since a ratio of the 255 grayscale value 255G is 0.3, a ratio of 50 grayscale value 50G is 0.1, and a ratio of 0 grayscale value 0G is 0.6, the first self-scan voltage SSV1, the second self-scan voltage SSV2, and the third self-scan voltage SSV3 may be the grayscale voltage V100 corresponding to 100 grayscale value.

In an embodiment, for example, as shown in FIG. 13, the input image data IMG applied in the second driving frame FF2 following the first driving frame FF1 may include 100% of 0 grayscale value 0G. In the second driving frame FF2, since the input image data IMG includes 100% of 0 grayscale value, the first self-scan voltage SSV1, the second self-scan voltage SSV2, and the third self-scan voltage SSV3 may be the grayscale voltage V0 corresponding to 0 grayscale value.

In an embodiment, for example, in the first driving frame FF1, the self-scan voltage SSV1, SSV2, and SSV3 may be the grayscale voltage V100 corresponding to 100 grayscale value. Accordingly, in the display scan period DP of the first driving frame FF1, the source driver 400 may apply the grayscale voltage V255 corresponding to 255 grayscale value to the first data line DL1 as the data voltage VD, may apply the grayscale voltage V0 corresponding to 0 grayscale value to the second data line DL2 as the data voltage VD, and may apply the grayscale voltage V0 corresponding to 0 grayscale value to the third data line DL3 as the data voltage VD. And, in the self-scan period SSP of the first driving frame FF1, the source driver 400 may apply the grayscale voltage V100 corresponding to the 100 grayscale value to the first data line DL1 as the first self-scan voltage SSV1, may apply the grayscale voltage V100 corresponding to 100 grayscale value to the second data line DL2 as the second self-scan voltage SSV2, and may apply the grayscale voltage V100 corresponding to 100 grayscale value to the third data line DL3 as the third self-scan voltage SSV3. Also, in the display scan period DP of the second driving frame FF2, the source driver 400 may apply the grayscale voltage V0 corresponding to 0 grayscale value to the first data line DL1 as the data voltage VD, may apply the grayscale voltage V0 corresponding to 0 grayscale value to the second data line DL2 as the data voltage VD, and may apply the grayscale voltage V0 corresponding to 0 grayscale value to the third data line DL3 as the data voltage VD. In the self-scan period SSP of the second driving frame FF2, the source driver 400 may apply the grayscale voltage V0 corresponding to 0 grayscale value to the first data line DL1 as the first self-scan voltage SSV1, may apply the grayscale voltage V0 corresponding to 0 grayscale value to the second data line DL2 as the second self-scan voltage SSV2, and may apply the grayscale voltage V0 corresponding to 0 grayscale value to the third data line DL3 as the third self-scan voltage SSV3.

Figure 15:
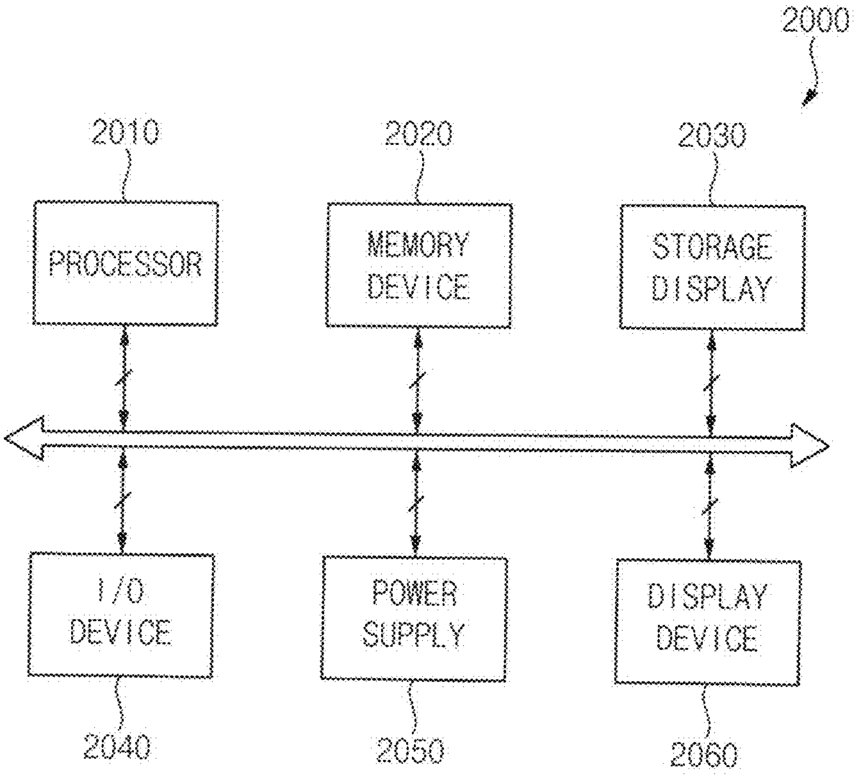
FIG. 15 is a block diagram showing an electronic device according to embodiments of the invention.
Figure 16:
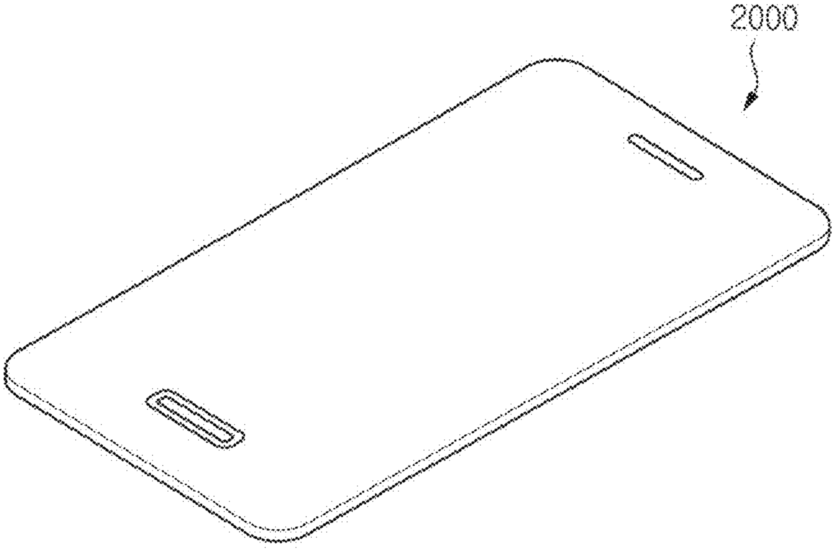
FIG. 16 is a diagram showing an embodiment in which the electronic device of FIG. 15 is implemented as a smart phone.

FIG. 15 is a block diagram showing an electronic device according to embodiments of the invention, and FIG. 16 is a diagram showing an embodiment in which the electronic device of FIG. 15 is implemented as a smart phone.

Referring to FIGS. 11 and 12, an embodiment of the electronic device 2000 may include a processor 2010, a memory device 2020, a storage device 2030, an input/output (I/O) device 2040, a power supply 2050, and a display device 2060. Here, the display device 2060 may be the display device 1000 of FIG. 1. In such an embodiment, the electronic device 2000 may further include a plurality of ports for communicating with a video card, a sound card, a memory card, a universal serial bus (USB) device, other electronic devices, etc. In an embodiment, as shown in FIG. 16, the electronic device 2000 may be implemented as a smart phone. However, the electronic device 2000 is not limited thereto. In an alternative embodiment, for example, the electronic device 2000 may be implemented as a cellular phone, a video phone, a smart pad, a smart watch, a tablet PC, a car navigation system, a computer monitor, a laptop, a head mounted display (HMD) device, etc.

The processor 2010 may perform various computing functions. The processor 2010 may be a micro processor, a central processing unit (CPU), an application processor (AP), etc. The processor 2010 may be coupled to other components via an address bus, a control bus, a data bus, etc. Further, the processor 2010 may be coupled to an extended bus such as a peripheral component interconnection (PCI) bus.

The memory device 2020 may store data for operations of the electronic device 2000. In an embodiment, for example, the memory device 2020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc.

The storage device 2030 may include a solid state drive (SSD) device, a hard disk drive (HDD) device, a CD-ROM device, etc.

The I/O device 2040 may include an input device such as a keyboard, a keypad, a mouse device, a touch pad, a touch screen, etc., and an output device such as a printer, a speaker, etc. In some embodiments, the I/O device 2040 may include the display device 2060.

The power supply 2050 may provide power for operations of the electronic device 2000. In an embodiment, for example, the power supply 2050 may be a power management integrated circuit (PMIC).

The display device 2060 may display an image corresponding to visual information of the electronic device 2000. In an embodiment, for example, the display device 2060 may be an organic light emitting display device or a quantum dot light emitting display device, but is not limited thereto. The display device 2060 may be coupled to other components via the buses or other communication links. In such an embodiment, as described above, the display device 2060 may minimize a voltage change of the anode electrode of the light emitting element caused by coupling between the anode electrode of the light emitting element and the data line by flexibly determining the self-scan voltages.

In an embodiment, the display device 2060 may include a display panel including the first sub-pixel which displays the first color and is connected to the first data line and the gate line, the gate driver which provides the gate signal to the gate line, the source driver which provides the data voltage to the first data line in the display scan period of a frame and provides the first self-scan voltage to the first data line in the self-scan period of the frame, and the timing controller which calculates the first ratio of each of the grayscale values of the first color image data for the first color of the frame and determines the first self-scan voltage based on the first ratio. Since such an embodiment of the display device 2060 is substantially the same as those described above with reference to FIGS. 1 to 9, any repetitive detailed description thereof will be omitted.

In an embodiment, the display device 2060 may include the display panel including the first sub-pixel which displays a first color and is connected to the first data line and the gate line, the gate driver which provides the gate signal to the gate line, the source driver providing the data voltage to the first data line in the display scan period and provides the first self-scan voltage to the first data line in the self-scan period, and the timing controller which determines the first self-scan voltage based on the first average grayscale value of different grayscale values of the first color image data for the first color of the frame. Since such an embodiment of the display device 2060 is substantially the same as those described above with reference to FIGS. 11 and 12, any repetitive detailed description thereof will be omitted.

In an embodiment, the display device 2060 may include the display panel including the first sub-pixel which displays the first color and is connected to the first data line and the gate line, the gate driver which provides the gate signal to the gate line, the source driver which provides the data voltage to the first data line in the display scan period and provides the first self-scan voltage to the first data line in the self-scan period, and the timing controller which calculates the ratio of each of grayscale values of the input image data and determines the first self-scan voltage based on the ratio. Since such an embodiment of the display device 2060 is substantially the same as those described above with reference to FIGS. 13 and 14, any repetitive detailed description thereof will be omitted.

Embodiments of the invention may be applied to any electronic device including the display device. In an embodiment, for example, an embodiment described herein may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a first sub-pixel which displays a first color and is connected to a first data line and a gate line;

a gate driver which provides a gate signal to the gate line;

a source driver which provides a data voltage to the first data line in a display scan period of a frame and provides a first self-scan voltage to the first data line in a self-scan period of the frame; and a timing controller which calculates a first ratio of each of grayscale values of first color image data for the first color of the frame and determines the first self-scan voltage based on the first ratio.

2. The display device of claim 1, wherein the timing controller determines a sum of products of a grayscale voltage corresponding to each of the grayscale values of the first color image data and the first ratio as the first self-scan voltage.

3. The display device of claim 1, wherein the display panel further includes a second sub-pixel which displays a second color and is connected to a second data line and a third sub-pixel which displays a third color and is connected to a third data line, wherein the source driver provides the data voltage to the second data line and the third data line in the display scan period, provides a second self-scan voltage to the second data line in the self-scan period, and provides a third self-scan voltage to the third data line in the self-scan period, and wherein the timing controller calculates a second ratio of each of grayscale values of second color image data for the second color of the frame, determines the second self-scan voltage based on the second ratio, calculates a third ratio of each of grayscale values of third color image data for the third color of the frame, and determines the third self-scan voltage based on the third ratio.

4. The display device of claim 3, wherein the timing controller determines a voltage corresponding to a sum of products of a grayscale voltage corresponding to each of the grayscale values of the second color image data and the second ratio as the second self-scan voltage, and wherein the timing controller determines a voltage corresponding to a sum of products of a grayscale voltage corresponding to each of the grayscale values of the third color image data and the third ratio as the third self-scan voltage.

5. The display device of claim 1, wherein the display panel further includes a second sub-pixel which displays a second color and is connected to a second data line and a third sub-pixel which displays a third color and is connected to a third data line, wherein the source driver provides the data voltage to the second data line and the third data line in the display scan period, provides a second self-scan voltage to the second data line in the self-scan period, and provides a third self-scan voltage to the third data line in the self-scan period, and wherein the timing controller determines the second self-scan voltage and the third self-scan voltage based on the first ratio.

6. The display device of claim 5, wherein the timing controller determines a voltage corresponding to a sum of products of a grayscale voltage corresponding to each of the grayscale values of the first color image data and the first ratio as each of the first self-scan voltage, the second self-scan voltage, and the third self-scan voltage.

7. The display device of claim 5, wherein the first color is a green color.

8. The display device of claim 1, wherein a data writing operation and a light emitting operation are performed in the display scan period, and wherein the light emitting operation is performed without the data writing operation in the self-scan period.

9. A display device comprising:

a display panel including a first sub-pixel which displays a first color and is connected to a first data line and a gate line;

a gate driver which provides a gate signal to the gate line;

a source driver which provides a data voltage to the first data line in a display scan period of a frame and provides a first self-scan voltage to the first data line in a self-scan period of the frame; and a timing controller which determines the first self-scan voltage based on a first average grayscale value of different grayscale values of first color image data for the first color of the frame.

10. The display device of claim 9, wherein the timing controller determines a grayscale voltage corresponding to the first average grayscale value as the first self-scan voltage.

11. The display device of claim 9, wherein the display panel further includes a second sub-pixel which displays a second color and is connected to a second data line and a third sub-pixel which displays a third color and is connected to a third data line, wherein the source driver provides the data voltage to the second data line and the third data line in the display scan period, provides a second self-scan voltage to the second data line in the self-scan period, and provides a third self-scan voltage to the third data line in the self-scan period, and wherein the timing controller determines the second self-scan voltage based on a second average grayscale value of different grayscale values of second color image data for the second color of the frame, and determines the third self-scan voltage based on a third average grayscale value of different grayscale values of third color image data for the third color of the frame.

12. The display device of claim 11, wherein the timing controller determines a grayscale voltage corresponding to the second average grayscale value as the second self-scan voltage, and wherein the timing controller determines a grayscale voltage corresponding to the third average grayscale value as the third self-scan voltage.

13. The display device of claim 9, wherein the display panel further includes a second sub-pixel which displays a second color and is connected to a second data line and a third sub-pixel which displays a third color and is connected to a third data line, wherein the source driver provides the data voltage to the second data line and the third data line in the display scan period, provides a second self-scan voltage to the second data line in the self-scan period, and provides a third self-scan voltage to the third data line in the self-scan period, and wherein the timing controller determines the second self-scan voltage and the third self-scan voltage based on the first average grayscale value.

14. The display device of claim 13, wherein the timing controller determines a grayscale voltage corresponding to the first average grayscale value as each of the first self-scan voltage, the second self-scan voltage, and the third self-scan voltage.

15. The display device of claim 13, wherein the first color is a green color.

16. The display device of claim 9, wherein a data writing operation and a light emitting operation are performed in the display scan period, and wherein the light emitting operation is performed without the data writing operation in the self-scan period.

17. A display device comprising:

a display panel including a first sub-pixel which displays a first color and is connected to a first data line and a gate line;

a gate driver which provides a gate signal to the gate line;

a source driver which provides a data voltage to the first data line in a display scan period of a frame and provides a first self-scan voltage to the first data line in a self-scan period of the frame; and a timing controller which calculates a ratio of each of grayscale values of input image data of the frame and determines the first self-scan voltage based on the ratio.

18. The display device of claim 17, wherein the timing controller determines a voltage corresponding to a sum of products of a grayscale voltage corresponding to each of the grayscale values of the input image data and the ratio as the first self-scan voltage.

19. The display device of claim 17, wherein the display panel further includes a second sub-pixel which displays a second color and is connected to a second data line and a third sub-pixel which displays a third color and is connected to a third data line, wherein the source driver provides the data voltage to the second data line and the third data line in the display scan period, provides a second self-scan voltage to the second data line in the self-scan period, and provides a third self-scan voltage to the third data line in the self-scan period, and wherein the timing controller determines the second self-scan voltage and the third self-scan voltage based on the ratio.

20. The display device of claim 19, wherein the timing controller determines a voltage corresponding to a sum of products of a grayscale voltage corresponding to each of the grayscale values of the input image data and the ratio as each of the first self-scan voltage, and the second self-scan voltage, and the third self-scan voltage.

* * * * *